(No Model.)

J. KIRBY, Jr.
CAR BASKET RACK.

No. 268,498. Patented Dec. 5, 1882.

Witnesses:
Alfred O. Elzner

Inventor:
John Kirby Jr
By Jeptha Garrard
his Atty

UNITED STATES PATENT OFFICE.

JOHN KIRBY, JR., OF LUDLOW, KENTUCKY, ASSIGNOR TO POST & CO., OF CINCINNATI, OHIO.

CAR BASKET-RACK.

SPECIFICATION forming part of Letters Patent No. 268,498, dated December 5, 1882.

Application filed July 11, 1882. (No model.)

*To all whom it may concern:*

Be it known that I, JOHN KIRBY, Jr., of Ludlow, Kenton county, and State of Kentucky, have invented a new and useful Improvement in Car Basket-Racks, of which the following is a specification, reference being had to the accompanying drawings, forming a part of this specification, in which—

Figure 1:
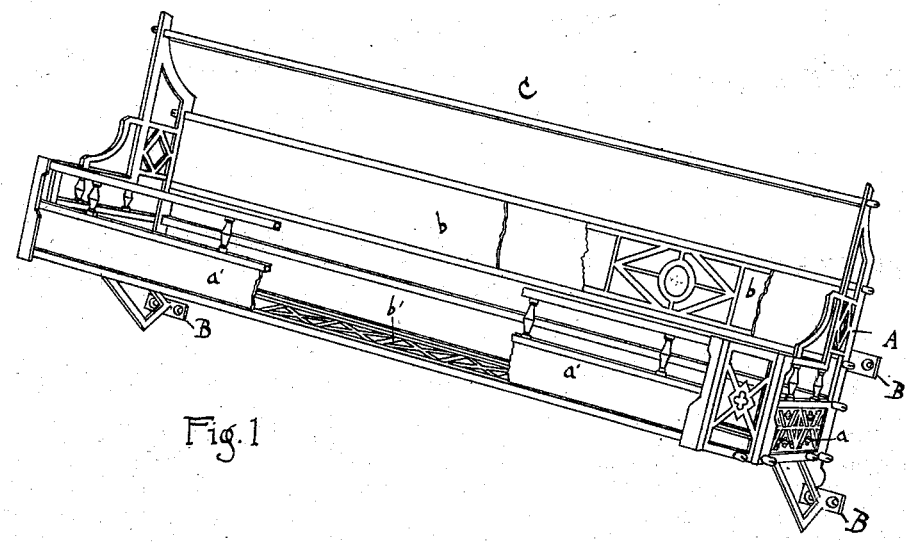
Figure 5:
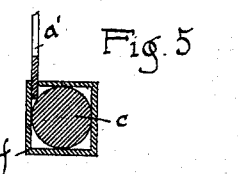
Figure 2:
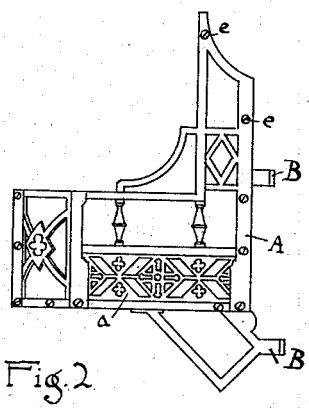
Figure 3:
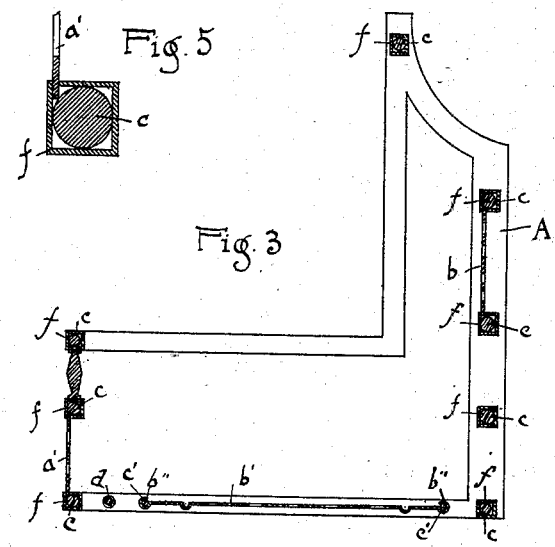
Figure 4:
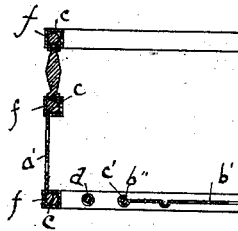

Figure 1 is a view of the basket-rack with part of front cut away, exposing perforated plate on bottom. Fig. 2 is a geometrical elevation of cast end of basket-rack. Fig. 3 is an enlarged cross-section of basket-rack. Fig. 4 is a plan of cast end A. Fig. 5 is a section of a tube, with its inclosed rod, and the sheet metal inserted in the tube at one side and soldered.

Similar letters of reference in the several drawings denote the same parts.

A is the cast end of basket-rack; B, brackets with screw-holes for fastening basket-rack to car; C, basket-rack with front cut away; $a$, perforated sheet metal of ends; $a'$, sheet-metal front, (perforations not shown, but broken to show edge of metal and how connected above and below to tubes;) $b$, perforated sheet-metal back; $b'$, perforated sheet-metal bottom; $c$, rods for connecting ends inside tubes $f$; $f$, tubes of sheet-metal incasing rods $c$; $d$, a connecting-rod in its tube; $b''$, ends of sheet-metal bottom turned up to form tubes inclosing connecting-rod $c$; $e$, screw-heads on rods $c$, projecting through cast ends A.

My invention relates to car basket racks. These basket-racks are ordinarily made of wire-netting attached to tubes. A rod runs through these tubes from one end to the other to stiffen and strengthen the tubes. The rods are secured to the ends of the rack by nuts screwed on the ends of the rods projecting through the ends of rack.

I use perforated sheet metal in making my basket-rack; and my invention consists in making the ends of my basket-rack of one casting, A, with the front turned at an angle, so that the rack, when built, shall have a broken or rounded corner. This will make the rack stronger than when made in the usual way with a square corner, since the front webbing is shorter for basket-racks of a given length when made in this way. Another advantage of my broken-corner rack is that it avoids sharp corners and points, which are always objectionable in the furniture of a railway passenger-car. I make the webbing of perforated sheet metal instead of wire. The webbing is shown in drawings as $b$ for back webbing; $b'$, for bottom; $a$, for ends and front.

In the drawings the bottom of the rack is perforated sheet metal with its edges turned to form a tube, $b''$, through which the supporting-rod $c'$ runs. This bottom is much stiffer and more serviceable than a wire bottom. The front and back are perforated sheet metal let into the tubes and soldered.

Having thus described my invention, what I claim as new, and desire to secure by Letters Patent, is as follows:

1. As an article of manufacture, a car basket-rack with ends of cast metal having an angled portion, said angled portion forming part of the front of the rack, substantially as described.

2. In a car basket-rack, the combination of cast-metal ends, having an angled portion forming part of the front of the rack, and a perforated sheet-metal front, back, or bottom, substantially as described.

The foregoing specification of my invention signed by me this 7th day of July, A. D. 1882.

JOHN KIRBY, JR.

Witnesses:
RICHARD L. AYER,
JEPTHA GARRARD.